3,161,121
PROCESS AND APPARATUS FOR THE MANUFACTURE OF PHOTOPRINTS FROM COMPOSED TRANSLUCENT LAMINAR ORIGINALS
Theodoor Hillebrand Linthout, Venlo, Netherlands, assignor to Chemische Fabriek L. van der Grinten N.V., Venlo, Netherlands, a corporation of the Netherlands
Filed June 22, 1961, Ser. No. 118,885
9 Claims. (Cl. 95—77.5)

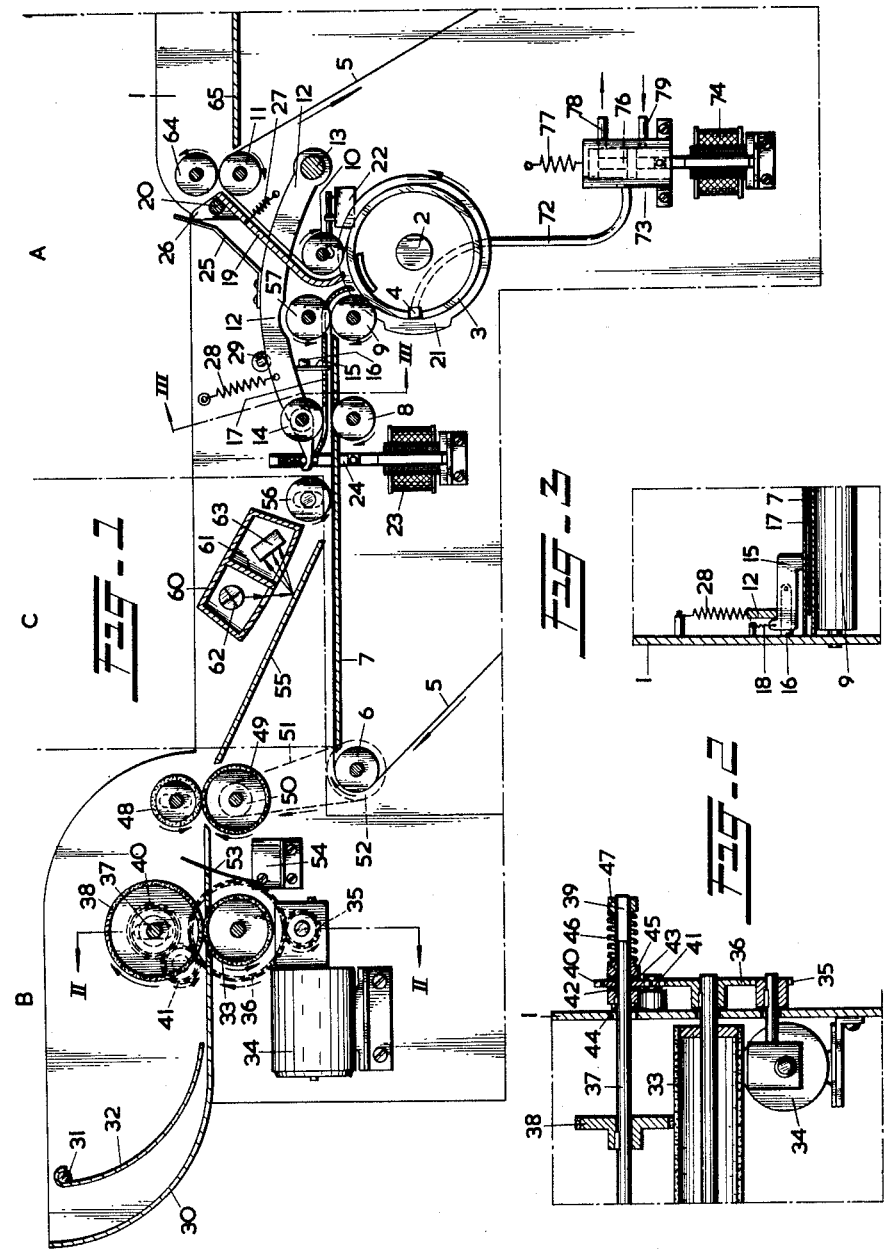

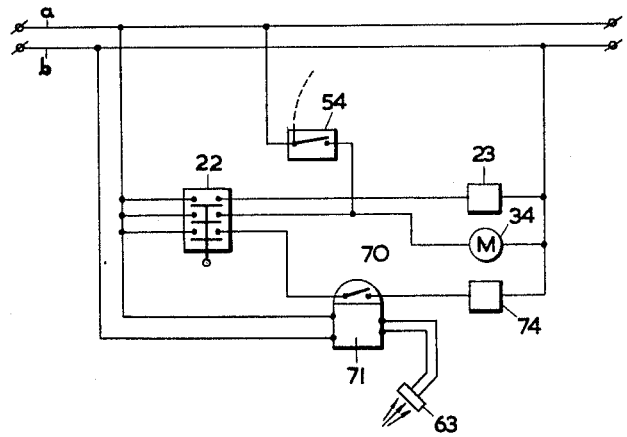

The invention relates to a process and apparatus for the manufacture of photoprints from composite translucent laminar originals, each consisting of a combination of at least two loosely superimposed originals, of which one is a so-called main original and one a so-called additional original.

The invention relates, more particularly, to a kind of photoprinting in which the main and additional originals to be copied are fed around a revolving exposure cylinder together with the photoprinting material, the originals being sandwiched between the photoprinting material and the outer surface of the exposure cylinder, which latter is provided with a device for holding the leading edge of originals and cooperates with a device operating at least whenever the copy or copies from a combination is (are) complete so as to remove from the cylinder any originals which are not, or no longer, affixed thereto, while the photoprinting material is exposed no longer than the time required for one revolution of the exposure cylinder.

The manufacture of photoprints from combinations of superimposed originals, which is common knowledge in the photoprinting technique, is referred to by the term "combination printing." When copies are manufactured in this way from combinations obtained by combining one original successively with different originals, the one original is called the main original; the other originals are called additional originals. Naturally every main or additional original in turn may be composed of superimposed or juxtaposed parts which have been joined together in a suitable way to form one unit.

If only a small number of combinations of originals have to be handled, or if only one or a few copies are wanted from one combination, few difficulties will be encountered in working with known photoprinting apparatus, such, for example, as apparatus according to Dutch Patent No. 66,774. If, however, large sets of additional originals or many combinations of different main originals with the corresponding additional originals have to be handled, copying them in such apparatus is not attractive because of the considerable loss of time involved in changing and combining the originals and because of the great risk of errors.

Although with an apparatus according to Belgian patent No. 571,684 combination printing can be carried out with little liability of error and with comparatively few manual operations, that apparatus also offers some disadvantages. Among them is that the additional originals have to be combined in the form of a web each time, especially if several sets of additional originals have to be used successively, while a given additional original has to be used in more than one of these sets. Moreover a good deal of time is always lost owing to the combination of the originals and the stepwise displacement of the web of photoprinting material, necessitated by the discontinuous operation of the apparatus.

It is the object of the invention to provide a process and apparatus which make it possible to make photoprints from composite originals in a continuous way without the above-mentioned disadvantages of the known processes and apparatus.

To attain this objects, according to the invention first the main original is fed to the exposure cylinder and affixed thereto by its leading edge, such as by means of the known device for holding originals, and afterwards the additional originals complementary to the main original are fed successively to the exposure cylinder and, after being exposed successively, each so as to give the desired number of copies of the composite original of which it forms a part, the additional originals are removed from the exposure cylinder in the same order in which they were fed thereto. Meanwhile, the device for holding the leading edge of the main original is kept in operation and the main original gripped by this device is allowed to move along with the cylinder until the desired number of copies has been made from the last of the additional originals belonging to the said main original.

According to the invention large sets of additional originals with the corresponding main originals can be rapidly copied. One merely has to feed the originals one by one to the cylinder to produce the desired combinations. It will be obvious that the liability of error is extremely small in this case.

Since moreover the additional originals need not be joined together, they can be easily removed from a set and added to another set in any desired order.

The continuous operation of the exposure cylinder moreover offers the advantage that no time is lost in making up the combinations. In fact, the arrangement of the main and/or additional originals takes place without the exposure having to be interrupted. As an exposed additional original is removed the next additional original can already be fed to the cylinder.

In the simplest form of the invention the originals are fed to the exposure cylinder by hand. Of course, care has to be taken that the originals always arrive at the right place on the surface of the exposure cylinder, the leading edge of the main original being within reach of the holding device and the additional originals being in register on top of the main original. In order to avoid errors in the feeding of the originals, it is possible to equip the exposure cylinder with a device (such as a cam engaging with a switch) by means of which a signal is excited whenever the cylinder is in a favourable position for feeding an original. If desired, this signal may be used as a controlling signal for an automatically operating device for feeding the originals. In that case one merely has to see to it that an original is present in the feeding device whenever the latter comes into operation.

Even more far-reaching automation is possible when the originals are put ready not by hand but by means of a sheet-feeding device (known per se) for feeding the originals one by one. It is then possible to put the main and additional originals ready in stacks in such a way that each time the main original is fed in first, and then the corresponding additional originals are fed in successively.

In a very attractive embodiment of the invention the main originals and additional originals on their way to the exposure cylinder are guided past a stationary reaction device and they are chosen in such a way that they differ from each other in a sensible quality which is important to the response of said reaction device, so that this device sends a signal as soon as a main original moves past it. In response to this signal, the exposed main original is removed from the exposure cylinder and the next main original is affixed to it.

In order to obtain the desired signal, the main and/or additional originals may differ from each other in many ways. In a simple form of the invention the difference is obtained by punching perforations in the main originals, which perforations may be scanned either photoelectrically or mechanically. It is also possible to provide one of the two kinds of original with means, such as conducting strips, with which the desired signal can be excited, for instance by closing an electrical contact.

Preferably, however, a method is employed which does not call for a special treatment of the main and/or additional originals or the provision of distinctive marks thereon.

In a very attractive form of the invention the originals are so chosen that the main originals have different light transmission or reflecting power from the additional originals and a reaction device is used with a photoelectric element which responds to the differences in light transmission or reflecting power. Although the main originals can be affixed and removed by hand, this too will preferably be done in a more or less automatic way. For this purpose, however, the holding device has to engage the control members which are operated by hand or which respond to the above-mentioned signal. A very suitable device for this purpose is, for instance, a pneumatically operating holding device of known character which can be connected with the suction or the delivery side of an air pump by means of an electromagnetically operated valve. If the holding device is connected with the suction side of the air pump, it can suck the leading edge of a main original onto the surface of the exposure cylinder; if on the other hand it is connected with the delivery side of the pump, the main original is blow off and then removed from the cylinder surface.

If a combination of a main original and an additional original has to be copied several times, it is sufficient to affix only the main original to the exposure cylinder and to allow the additional original to move along loosely with the cylinder. In that case, however, it may happen that after a number of revolutions of the cylinder the additional original has been shifted over the main original, so that the register between the two originals has been disturbed. To prevent this, the leading edge of the additional original in such a case will also be affixed to the exposure cylinder by means of a device for holding originals and this device will be kept in operation until the desired number of copies has been made from the respective additional original.

The device for holding the additional original may be of the same construction as that of the device by which the main original is held.

The invention relates also to apparatus for making photo-prints from composite translucent laminar originals, each consisting of a combination of two loosely superimposed originals, of which one is a so-called main original and one a so-called additional original, said device comprising a revolving exposure cylinder equipped with a controllable device for holding the leading edge of a laminar original, means for guiding photoprinting material around the exposure cylinder and means for removing an exposed original from the exposure cylinder. Apparatus of this type has already been suggested.

The apparatus according to the present invention is distinguished from the known device by the inclusion of means for successively feeding the originals one by one and means for scanning the originals fed and for sending an impulse for controlling the holding device as a main original is fed.

The device according to the invention is extremely well suited for continuously making photoprints from sets of main and additional originals, each of the additional originals of a set being combined one by one with each of the main originals.

If the device has to be made suitable for making more than one copy from a given combination of two originals and premature removal of the additional original is to be prevented, the device is preferably equipped with controllable means for bringing the means for the removal of exposed originals from an inoperative to an operative position. These controllable means may consist, for instance, of an adjustable counting mechanism which, whenever the desired number of copies has been made from an additional original, sends an impulse by which the removing means are brought from one position to the other.

The device according to the invention is preferably equipped with a controllable feeding device for feding the originals to the exposure cylinder, a removable stop between the feeding device and the exposure cylinder for arresting the originals, and a cam rotating synchronously with the exposure cylinder and cooperating with an impulse sender, the feeding device being put into operation through engagement of the cam with the impulse sender, the stop then being removed, and the removing device being brought in its operative position.

By including these features the device is able to perform the process according to the invention fully automatically.

The invention will be explained more fully with the aid of the accompanying drawings illustrating a photoprinting apparatus which is suited for the automatic performance of the process according to the invention in those cases where, each time, one photoprint is made from a combination of laminar originals (DIN A. 4 size, for instance), of which the main original has greater reflecting power than the additional originals.

FIGURE 1 is a diagrammatic longitudinal section of the apparatus.

FIGURE 2 is a partial cross-section of the apparatus according to FIGURE 1 along the line II—II'.

FIGURE 3 is a partial cross-section of the apparatus according to FIGURE 1 along the line III—III'.

FIGURE 4 is a diagram of the electric wiring of the apparatus according to FIGURES 1, 2, and 3.

The apparatus is composed of a number of devices of types generally known per se, viz. an exposure unit A, a device B for feeding originals, and a photoelectric detector and master device C.

Mounted in the exposure unit (A) between the frame plates 1 is a tubular high-pressure mercury vapour lamp 2. Revolving around the lamp 2 is a glass exposure cylinder 3, supported in bearings on the frame plates 1. A controllable pneumatic holding device for originals is fitted in the surface of cylinder 3. This holding device consists of an air channel 4, fitted in the cylinder surface along a generating line and provided with openings which open into the outer surface of the cylinder. Via the flexible air pipe 72 and valve 73 the air channel can be connected with the delivery side or the suction side of a continuously operating air pump (not shown). Valve 73 is operated electromagnetically by means of a magnet 74. The valve 73 consists of a cylinder 75 in which the double piston 76 can be moved up and down. At one end piston 76 is connected with the movable core of magnet 74 and at the other end with a spring 77. If magnet 74 is not excited, spring 77 keeps the piston 76 in its uppermost (shown) position. In that case the pipe 72 and thus the air channel 4 are connected with the suction side of the air pump by means of pipe 78. If, however, magnet 74 is excited, piston 76 is in its lowermost position and pipe 72 is connected with pipe 79, and thus with the delivery side of the air pump.

The light-sensitive material to be exposed, such as diazo-type material, is guided through the apparatus in the form of a web (5). It passes over roller 6, guiding plate 7, rollers 8 and 9, exposure cylinder 3, and the rollers 10 and 11.

The light-sensitive material, the rollers, and the exposure cylinder move as indicated by arrows. Beyond roller 11 the exposed light-sensitive material is cut into pieces, developed, etc. (in a part of the apparatus not shown in the drawing).

The exposure unit (A) is further equipped with a mechanism controlling the feeding of the originals to the exposure cylinder and their removal from it. The mechanism comprises two arms 12, mounted on either side of web 5, which are rigidly connected together and which are adapted to pivot on shaft 13. The feeding roller 14 is rotatably supported in the arms 12. Further the mechanism comprises two stops 15, which are adapted to pivot on supports 16 which are secured to frame 1 (see FIGURE 3). One end of each stop 15 passes through an opening in guiding plate 17 and rests on web 5. The extension springs 18 acting on the other end of the stops 15 hold the stops in the desired position.

Further a guide 19, which is adapted to turn on shaft 20, forms part of the mechanism.

Rigidly secured to exposure cylinder 3 is a disc with a cam 21. With every revolution of cylinder 3 cam 21 closes the contacts of switch 22 for a short time. Via a (first) contact of the switch 22, an electromagnet 23 is excited, which then actuates the arms 12 via bar system 24. In consequence the feed roller 14 is forced towards roller 8. At the same time the arms 12 press on the stops 15, as a result of which the ends of the stops, which hitherto rested on web 5, are lifted. At the same time the arm 25, which is connected with one of the arms 12, is disengaged from a projection 26 of guide 19. Under the influence of spring 27 guide 19 then turns on shaft 20, so that the lower edge of guide 19 scrapes on cylinder 3. As soon as cam 21 releases switch 22 (this happens when cam 21 reaches roller 9) and electromagnet 23 is thus no longer excited, the arms 12 and roller 14, stops 15, and guide 19 return to their starting position (shown in the figures); this is due to the influence of the pull exerted by the springs 28 and 18 and the pressure exerted by arm 25 on projection 26 against the pull of spring 27. Stop 29 limits the movement of the arms 12.

The feeding device for originals (B) comprises a curved table 30, on which the main and additional originals to be copied can be put ready in a stack. A pressure plate 32, which is adapted to turn around shaft 31, exerts a slight pressure on the originals lying in readiness. A conveyor roller 33 supported in stationary bearings on the frame plates 1 extends through an opening in table 30. Roller 33 has a cover of wear-resistant elastic rubber. When cam 21 of the exposure unit closes switch 22, motor 34 is started via a (second) contact of this switch. Roller 33 is then driven as indicated by arrows, by means of the gear wheels 35 and 36. A shaft 37, on which a number of discs are mounted at intervals of 10 cm., for instance, is supported on the frame plates 1 so as to be movable. The discs 38, which rest against the cover of roller 33 under a pressure which is caused by their own weight, the weight of shaft 37, and the weight of the parts (to be described later) connected with shaft 37, have a cover of Vulkollan (polyurethane of Bayer A.G., Leverkusen, Germany).

Rotatably supported on the journal 39 of shaft 37 (see FIGURE 2), extending through the frame plate 1, is the gear wheel 40. Via intermediate wheel 41, gear wheel 40 meshes with gear wheel 36. When motor 34 has been excited, gear wheel 40 is thus driven and rotates as indicated by the broken arrow.

Gear wheel 40 forms part of a slip clutch system mounted on journal 39, which further comprises slipping discs 42 and 43, clutch discs 44 and 45, spring 46, and nut 47. Clutch disc 44 is rigidly secured on journal 39; clutch disc 45 is provided with a projecting key, adapted to slide in a slot in the journal 39. Clutch disc 45 can thus be moved in the axial direction on journal 39. Nut 47 can be moved on the threaded end of the journal 39, and by means of nut 47 the degree of compression of the spring 46 can be varied, and thus the value of the couple which is transmitted from the gear wheel 40 to shaft 37 via the slip clutch can be adjusted to the desired value.

A stack of originals put ready on table 30 moves, by gravity, over the table until the leading edges of the originals reach into the nip between roller 33 and selection discs 38. The lowermost original of the stack is then gripped by the rubber cover of roller 33 and taken along. Owing to the friction between this original and the covers of the discs 38 the original exerts also a driving force on these discs. This force counteracts the couple which acts on the discs 38 via the slip clutch described above and shaft 37.

By means of nut 47 the slip clutch has been adjusted in such a way that the couple exerted by it is too small to overcome the friction between the original and the discs 38. The discs will consequently move along with the original; as a result the slip clutch, which tends to drive the discs 38 continuously in the opposite direction, will slip.

When the lowermost original of the stack lying in readiness on table 30 is thus removed, the remainder of the stack (which rests on the lowermost original) is fed to the nip between roller 33 and discs 38. If two originals thus get between conveyor roller 33 and discs 38, roller 33 will no longer be able to exert sufficient driving force on the discs 38 via these originals (which are of course relatively smooth). Consequently the discs 38 are no longer driven by roller 33 but by the slip clutch; their direction of movement changes accordingly. Owing to friction the (second) original coming into contact with the discs 38 is carried along by the discs and thus rubbed back beyond the nip between roller 33 and discs 38. Only after the lowermost original has passed completely between roller 33 and discs 38, is the original that has been rubbed back able to pass between roller 33 and discs 38. If more than two originals at a time get between roller 33 and discs 38, only the lowermost of them will be removed normally; the other originals are rubbed back successively.

With this device the originals put ready in the form of a stack can thus be removed one by one. A removed original is moved over table 30 by roller 33 towards the rollers 48 and 49. By means of a rope pulley 50 mounted on the journal of roller 49, a rope 51, and a rope pulley 52 mounted on the journal of roller 6, the rollers 48 and 49 are driven continuously. The diameters of the pulleys 50 and 52 are so chosen that the circumferential velocity of the rollers 48 and 49 is greater than that of roller 33. In consequence an original present between the rollers 48 and 49 is accelerated and moved on by these rollers as soon as it has passed completely beyond roller 33. On its way between roller 33 and the rollers 48 and 49 the original reverses the lever 53 of switch 54. Via the contact thus closed the driving motor 34 remains excited when cam 21 releases switch 22. The rollers 48 and 49 convey the original over guiding plate 55 to the nip between a pressure roller 56 and the web of light-sensitive material 5. From there the original moves along with web 5 until it comes to rest against stops 15.

When cylinder 3 has revolved until cam 21 closes switch 22 and, through the excitement of coil 23, the bars 12 are moved as a result of which the stops 15 are lifted and roller 14 is forced down, the original is moved on between the rollers 9 and 57 towards the exposure cylinder 3.

Through the right choice of the circumferential velocity of the rollers 33, 48, and 49 the operation of the device has been synchronized in such a way that an original will always lie in readiness against stops 15 at the moment when cam 21 reaches the switch 22, and at the same time the position of switch 22 has been so chosen that the leading edge of an original that has been fed in will come to rest exactly against the openings of the air channel 4.

Mounted above guiding plate 55 (part C of the apparatus) is a box-shaped container 60, the interior of which is divided by screen 61 into two compartments, each of which is provided with an opening in the wall turned towards guiding plate 55. In one of the two compartments a small incandescent lamp 62 has been mounted and in the other a photoelectric element (photocell or photo-resistance) 63.

The photoelectric element forms part of an electronic switch 71. If the photoelectric element is (sufficiently) exposed, in the electronic switch 71 a contact 70 is closed which has been incorporated in the feed circuit of the magnet 74 of valve 73 in series with a (third) contact of switch 22.

If both contacts are closed (cam 21 resting against switch 22 and photoelectric element 63 being sufficiently exposed), the said magnet 74 is excited and air channel 4 will "blow"; if only one of the two contacts is closed, the magnet 74 remains unexcited and channel 4 will "suck."

When a main original lies ready against stops 15, the trailing part thereof, lying on guiding plate 55, will be irradiated by the light of incandescent lamp 62. Owing to the relatively great reflecting power of the main original a part of this light is reflected to the photoelectric element 63. When the electronic switch is properly adjusted, the contact of this switch will then be closed. When an additional original lies ready, less light is reflected owing to its smaller reflecting power; in that case the photoelectric element 63 is not irradiated sufficiently to close the contact 70 of the electronic switch 71.

If the device is to operate in the desired way, it is of course necessary that the reflecting power of the two types of original should differ sufficiently from each other. A favourable difference is obtained, for instance, if the main originals are made of transparent paper and the additional originals of cellulose acetate film. In order to avoid irradiation of the photoelectric element 63 owing to reflection by plate 55, this plate is covered with a material of poor reflecting power (it may be coated with a dull black varnish, for instance).

The main originals and additional originals to be copied are stacked in the correct order on table 30, so that the corresponding additional originals lie on top of each main original. When the web of light-sensitive material 5 is now driven, the originals are automatically copied in the desired manner. The procedure is then as follows: With the first revolution of cylinder 3, when cam 21 closes switch 22, the original-feeding device comes into operation and moves the lowermost main original over guiding plate 55. Before cylinder 3 has completed its second revolution, the original has come to rest against stops 15. Photoelectric element 63 is irradiated by the light reflected by the main original, and the electronic switch 71 is thus closed. As the cylinder continues to revolve and cam 21 closes the switch 22 again, the stops 15 are lifted and the main original is fed in. At the same time the magnet 74 is excited; the air channel 4 "blows" and guide 19 scrapes on cylinder 3. As the cylinder continues to revolve cam 21 releases switch 22 again. The excitement of the magnet 74 then disappears, so that air channel 4 will "suck" again. The leading edge of the main original is thus firmly sucked against the openings of channel 4 and taken along by cylinder 3. Immediately behind the main original the original-feeding device has moved a following (additional) original over guiding plate 55.

Now, owing to the smaller reflection of the additional original, the photoelectric element 63 is not irradiated sufficiently to close the contact 70 of the electronic switch 71. Hence the magnet 74 of valve 73 is not excited when cam 21 closes the switch 22 again. Channel 4 thus continues to "suck" and holds the main original also during thet next revolution of cylinder 3. The feed mechanism, however, does come into operation, so that the additional original is fed to the cylinder, being pressed against the main original by the light-sensitive material. As the cylinder continues to revolve the light-sensitive material is exposed imagewise by means of light transmitted through the main original and the additional original. In this way on the light-sensitive material a latent image is formed which is a combination of the images of main original and additional original. When, as cylinder 3 continues to revolve, cam 21 closes the feed-switch again, while guide 19 scrapes on the cylinder, the additional original is removed from the main original by this guide and passed over roller 10 and between the rollers 11 and 64 towards table 65.

During the exposure of the first additional original a second has meanwhile been fed. During the removal of the first, the second additional original is fed to the exposure cylinder and pressed against the main original. In the same way as described above, it is then exposed, etc.

The main original continues to be sucked on to air channel 4 as long as additional originals are fed. When all the additional originals belonging to a main original have thus been exposed and a new main original is fed from the stack lying ready on table 30, electronic switch 71 is operated via the photoelectric element. When cam 21 now closes the feed switch, the magnet 74 of the valve 73 is excited. Air channel 4 will then "blow." The main original present on cylinder 3 is thus disengaged and is guided to table 65, together with the (last) additional original that is simultaneously present. The main original fed in next is then sucked on to air channel 4, after which the cycle described above starts again. Of course, the device described may be varied in many ways.

Instead of the reflecting power of main and additional originals, the light-transmission of these originals can also be used to excite the signal to which the original-holding device of the exposure cylinder responds. In such a case lamp 62 will be mounted to one side of the path traversed by the originals, and the light-sensitive element 63 to the other side. In the device shown in the drawing this might be realized, for instance, by mounting the element 63 underneath the guiding plate 55 and by providing this plate with openings through which the light of the lamp 62 can fall direct on the element 63.

Instead of the exposure unit (A) used in the device according to the figure, other automatically operating photoprinting apparatus of known construction may also be used.

Instead of the original-feeding device (B) described other similar devices may of course be used, such as those described in United States patent specification No. 2,892,629.

In FIGURE 4 the electric wiring diagram of the device according to the figures is shown. In this figure the mains are marked a–b. The contacts of switch 22 are connected to these mains on one side. Via the uppermost (first) contact of switch 22, magnet coil 23 of the mechanism which controls the feed and removal of originals in unit A, is excited whenever cam 21 closes said switch.

Via the central (second) contact of switch 22, the driving motor 34 of the original-feeding device (B) is started in the same way. After an original that has been fed in has closed switch 54, motor 34 continues to be excited via this switch, which is a bridging-over of the second contact of switch 22.

The lowermost (third) contact of switch 22 is connected in series with contact 70 of electronic switch 71 and magnet 74 of the valve 73 referred to above. The electronic switch 71, which is excited from the mains a–b, is controlled via photoelectric element 63. Whenever a main original is fed in, and consequently the photoelectric element 63 is irradiated sufficiently, the contact 70 is closed. When subsequently switch 22 is closed as well, a circuit has been formed, through which magnet 74 is excited. The air channel 4 in the cylinder 3 is then connected to the delivery side of an air pump.

Although in the foregoing description it has been shown how the invention can be employed in a photoprinting process using diazotype material, the invention is not restricted to such a process. It may also be employed in processes in which other copying materials are used, such as silver halide, thermographic, electrophotographic material and the like.

I claim:

1. Apparatus for making photoprints from composite translucent laminar originals, each consisting of a combination of two loosely superimposed originals, of which one is a so-called main original and one a so-called additional original, said device comprising a revolving exposure cylinder equipped with a controllable device for holding the leading edge of a laminar original, means for successively feeding the originals to said exposure cylinder, the main originals differing from the additional originals in a quality sensible by a scanning of the originals, means for scanning the originals fed and responsive to said sensible quality of the main originals for sending an impulse to inactivate the holding device for release of an original from the cylinder as a main original is fed toward the cylinder, means for guiding photoprinting material around the exposure cylinder and means for removing an exposed original from the cylinder.

2. Apparatus according to claim 1, which includes controllable means for bringing the means for the removal of the exposed originals from an inoperative to an operative position.

3. Apparatus according to claim 1, which includes a controllable feeding device for feeding the originals to the exposure cylinder, a removable stop between the feeding device and the exposure cylinder for arresting the originals, a cam rotating synchronously with the exposure cylinder, impulse sending means operated by said cam, and means responsive to said impulse sending means to operate said feeding device and to remove said stop from the path of said originals and to move said original removing means from an inoperative to an operative position.

4. Process for the production of photoprints from composite translucent laminar originals, each consisting of a combination of two loosely superimposed originals of which one is a so-called main original and one a so-called additional original, which comprises feeding the main original to a revolving exposure cylinder, affixing it thereto, thereafter successively feeding step-wise to the exposure cylinder additional originals which are to be copied in combination with the main original, superimposing each additional original as it reaches the cylinder upon the main original thereon and sandwiching and exposing the resulting composite original between an area of photoprinting material and the exposure cylinder, removing each additional original from the cylinder after it has been copied, keeping the main original held to the cylinder until the last of said additional originals has been exposed therewith, and then releasing and removing the main original.

5. In a process according to claim 4, feeding successively to the exposure cylinder, through a common path, a multiplicity of originals comprising a plurality of main originals respectively followed by complementary additional originals, said main originals each having a sensible quality by which they differ from said additional originals, and sensing each main original as it approaches said cylinder and thereupon releasing and removing from said cylinder any preceding main original held thereon.

6. An apparatus for producing photoprints from composite light-pervious laminar originals, each consisting of a combination of two loosely superimposed originals of which one is a so-called main original and one a so-called additional original, comprising a rotatable exposure cylinder, means for feeding successively to said cylinder a multiplicity of originals including at least one main original followed by complementary additional originals, means for moving a web of photoprinting material continuously to and through an exposure path about and then away from said cylinder with rotation of said cylinder, means carried by said cylinder for holding to its surface each main original fed thereto, said feeding means including means operative to superimpose each additional original reaching said cylinder upon a preceding main original being held thereto so that the resulting composite original is sandwiched between a portion of said web and said cylinder and moved therewith through said exposure path, means for removing originals from said cylinder beyond said path, said holding means being operative to keep a main original held to said cylinder notwithstanding the operation of said removing means so that while a superimposed additional original is removed by such operation a main original will be kept on the cylinder so as to undergo exposures with respective additional originals of a succession of complementary additional originals, and means for inactivating said holding means so that said removing means will remove said main original from the cylinder when the last additional original of such succession has been exposed.

7. An apparatus according to claim 6, said means for inactivating said holding means including sensing means capable of distinguishing the main originals from the additional originals and responsive to the approach of a main original toward the exposure cylinder to inactivate said holding means, whereby a preceding main original will be released and removed from said cylinder.

8. An apparatus according to claim 7, said sensing means comprising a source directing light into the path of originals approaching said cylinder and a photoelectric device sensitive to the quantity of such light leaving each original, whereby the main originals may be distinguished from the additional original by a difference in their light transmission or light reflecting quality.

9. An apparatus according to claim 6, further including means for holding an additional original superimposed on a main original on said cylinder during a plurality of passes thereof through said exposure path, in order to produce a plurality of copies of the same composite original.

References Cited by the Examiner

UNITED STATES PATENTS 2,774,290   12/56   Mormann _____ 95—77.5

EVON C. BLUNK, *Primary Examiner.*

NORTON ANSHER, *Examiner.*